(12) United States Patent
Lefebvre et al.

(10) Patent No.: US 7,330,799 B2
(45) Date of Patent: Feb. 12, 2008

(54) METHOD AND ALGORITHM FOR USING SURFACE WAVES

(75) Inventors: Guy Lefebvre, Sherbrooke (CA); Mourad Karray Benhassen, Sherbrooke (CA)

(73) Assignee: Société de commercialisation des produits de la recherche appliquée-Socpra Sciences et Génie s.e.c., Sherbrooke (CA)

( * ) Notice: Subject to any disclaimer, the term of this patent is extended or adjusted under 35 U.S.C. 154(b) by 111 days.

(21) Appl. No.: 10/974,974

(22) Filed: Oct. 28, 2004

(65) Prior Publication Data

US 2005/0143924 A1 Jun. 30, 2005

Related U.S. Application Data

(63) Continuation-in-part of application No. 10/871,520, filed on Jun. 21, 2004, now abandoned, which is a continuation of application No. PCT/CA02/02013, filed on Dec. 23, 2002.

(30) Foreign Application Priority Data

Dec. 21, 2001 (CA) ................................. 2365336

(51) Int. Cl.
*G01R 23/00* (2006.01)
*G01R 13/00* (2006.01)
(52) U.S. Cl. .......................................... 702/75; 702/66
(58) Field of Classification Search .................... 702/2, 702/5, 14, 16, 18, 66, 75; 703/5; 367/57, 367/73; 73/596, 597
See application file for complete search history.

(56) References Cited

U.S. PATENT DOCUMENTS

| 4,575,830 A | * | 3/1986 | Ingram et al. ................. 367/26 |
| 5,894,092 A | * | 4/1999 | Lindgren et al. .............. 73/598 |
| 6,253,870 B1 | * | 7/2001 | Tokimatsu et al. ........... 181/122 |
| 2005/0072236 A1 | * | 4/2005 | Heyman et al. ............... 73/602 |

FOREIGN PATENT DOCUMENTS

FR 2 534 696 * 4/1984

OTHER PUBLICATIONS

Jones, R., 1958, in *In Situ Measurement of Dynamic Properties of Soil by Vibration Methods, Geotechnique*, London, England, vol. 8, p. 1.
Ballard, R.F., 1964, in *Determination of Soils Shear Moduli at Depth by in-situ Vibratory techniques*, Miscellaneous Paper No. 4-691, Waterways Experiment Station, Vicksburg, Ms, USA;
Heukelom, W. and Foster, C.R., 1960, in *Dynamic Testing of Pavement*, Journal of Structural Division, ASCE, vol. 86, No. SM-1, pp. 1-28).

(Continued)

*Primary Examiner*—Michael Nghiem
(74) *Attorney, Agent, or Firm*—Ogilvy Renault, LLP (57) ABSTRACT

A method and an algorithm allowing the use of surface waves. In particular, the method uses separation of the modes and, by the dispersion curve of more than one mode in the inversion process, it allows a determination of a shear wave propagation velocity profile that, with the aid of the Poisson ratio, constitutes a unique solution and a complete characterization of a medium on the point of view of its elastic properties.

5 Claims, 7 Drawing Sheets

OTHER PUBLICATIONS

Heisey, J.S. et al., 1982, in *Determination of in-situ Shear Waves Velocity from Spectral-Analysis-of-Surface-Waves*, Master thesis, University of Texas, Austin, USA, 300 pages.

Nazarian, S., and Stokoe, K.H., 1985, in *In-situ determination of elastic moduli of pavement systems by spectral-analysis-of-surface-waves method-practical aspects*, Research Report 368-1 F, center for transportation Research, University of Texas, Austin, USA, 161 pages).

Park et al., 1999, in *Multichannel analysis of surface waves*, Geophysics, vol. 64, N. 3, pp. 800-808.

Xia et al., 1999, in *Estimation of near surface shear wave velocity by inversion of Rayleigh waves*, Geophysics., vol. 64, N. 3, pp. 691-700.

Griffithst, D.H. and King, R.F. 1965, in *Applied Geophysics for engineers and geologistrs*, Pergamon Press, New York, p. 223.

Nazarian, S., 1984 in In Situ determination of elastic moduli of soil deposits and pavement systems by spectral-analysis-of-surface-waves method, PH. D. thesis in applied sciences, University of Texas, Austin, USA, 452 pages.

\* cited by examiner

FIG_3

FIG_4

FIG_6

METHOD AND ALGORITHM FOR USING SURFACE WAVES

RELATED APPLICATION

This application claims priority under U.S.C. 35C§120 and is a continuation-in-part of U.S. application Ser. No. 10/871,520 filed on Jun. 21, 2004, now abandoned and which claims priority and is a continuation of PCT application serial number PCT/CA02/02013 filed on Dec. 23, 2002 designating the United States and which claims priority of Canadian Patent application serial number 2,365,336 filed Dec. 21, 2001 now abandoned.

FIELD OF THE INVENTION

The present invention relates to a method and algorithms for data processing allowing the use of surface waves. In particular, the present invention concerns the separation and use of different Rayleigh modes, as well as a multi-modal inversion method that is fast and efficient.

DESCRIPTION OF THE PRIOR ART

The use of Rayleigh waves for characterizing and determining the dynamic properties of soil deposits and structures was initiated before the beginning of the 1950's by the German Society of Soil Mechanics and by Bergestrom and Linderholm, 1946.

Studies have led to the development of the so-called method of <<Steady-State>> based on constant frequency excitation by means of a vibrator (Jones, R., 1958, in *In Situ Measurement of Dynamic Properties of Soil by Vibration Methods*, Geotechnique, London, England, Vol. 8, p. 1; Ballard, R. F., 1964, in *Determination of Soils Shear Moduli at Depth by in-situ Vibratory techniques*, Miscellaneous Paper No. 4-691, Waterways Experiment Station, Vicksburg, Miss., USA; Heukelom, W. and Foster, C. R., 1960, in *Dynamic Testing of Pavement*, Journal of Structural Division, ASCE, Vol. 86, NO SM-1, pages 1-28).

This method is limited because of its slowness of execution as well as a lack of precision due to an empiric inversion method.

The SASW method (<<Spectral-Analysis-of-Surface-Waves>>) was developed around the beginning of the 1980's at the University of Texas (Heisey, J. S. et al., 1982, in Determination of in-situ Shear Waves Velocity from Spectral-Analysis-of-Surface-Waves, Master thesis, University of Texas, Austin, USA, 300 pages; Nazarian, S., 1984 in In Situ determination of elastic moduli of soil deposits and pavement systems by spectral-analysis-of-surface-waves method, PH.D. thesis in applied sciences, University of Texas, Austin, USA, 452 pages; Nazarian, S., and Stokoe, K. H., 1985, in In-situ determination of elastic moduli of pavement systems by spectral-analysis-of-surface-waves method—practical aspects, Research Report 368-1 F, center for transportation Research, University of Texas, Austin, USA, 161 pages). It is distinct from the Steady-state method by its speed of execution and by its more objective inversion method.

The SASW method consists of three steps: collection of data in the field, evaluation of the dispersion curve (phase velocity as a function of wavelength) and transformation of the latter into a continuous profile of shear wave velocity through an inversion process.

The SASW test is carried out on the soil surface. It consists of recording the surface waves generated by an impact source by means of two sensors spaced apart a distance noted <<D>>. The test is repeated for different spacing between the sensors (2 times D), 4 times $D_x$, 8 times D., 16 times D., etc . . . ). Generally, the sensors are placed at the same distance on both sides of a central point. The source, for its part, is located at a distance that is equal to the space between the sensors, with respect to the closest sensor.

The dispersion curve is determined first by calculating a crossed power spectrum that defines the phase difference, as a function of frequency, between the waves measured by the sensor that is furthest away from the source and those measured by the closest sensor (equivalent to the time required for the wave to travel from point 1 to point 2). The crossed power spectrum must then be unwrapped to determine the real phase difference. Knowing the distance between the sensors, the dispersion curve (velocity of the shear waves as a function of the wave length) is thus determined for each of these spacing. In the SASW method, only the waves having lengths between ½ and three times the space between the sensors are considered. Waves whose length are ½ the space between the sensors, as well as those that are greater than three times the space between the sensors, are therefore ignored (Heisey, 1982) in order to minimize the effect of the higher Rayleigh modes. The curve of total dispersion that corresponds to the average of the dispersion curves determined for the various spacing is then inversed in order to determine the velocity profile of the shear waves as a function of depth. In the SASW method, it is presumed that this curve is representative only of the fundamental mode of the Rayleigh waves.

To inverse a dispersion curve, the medium is represented by a group of N layers, each layer being characterized by a thickness, a Poisson ratio, a density and a shear wave velocity are. A theoretical dispersion curve corresponding to this medium is then determined and compared with the one obtained in the field. If the two curves, theoretical and experimental, coincide, the profile under consideration corresponds to the solution that is sought for. In the opposite case, the velocities assigned to the entire N layers are adjusted until there is an exact correspondence between the theoretical dispersion curve and the one obtained in the field.

At the end of the 1990's another method, called MASW ("Multichannel Analysis of Surface Waves") was developed by the Kansas Geological Survey. This method consists of measuring, by means of a number of sensors comprised between 20 and 64 or more, the waves obtained by means of an impact source or by means of a vibrator (constant frequency) (Park et al., 1999, in *Multichannel analysis of surface waves*, Geophysics, Vol. 64, N. 3, pages 800-808; Xia et al., 1999, in *Estimation of near surface shear wave velocity by inversion of Rayleigh waves*, Geophysics., Vol. 64, N. 3, pages 691-700; etc.).

Park et al. indicate that it is preferable to use a constant source of energy. Thus, for determining a dispersion curve (phase velocity according to frequency or wave length), it is necessary to carry out a series of tests in which the series of sensors are excited at different frequencies.

An analysis of the data in this method consists of measuring the degree of coherence between the signals: (1) filters on bands of given frequencies in the case where the tests are carried out by means of an impact source or (2) direct measurements by using a constant source of energy (vibrator). The dispersion curve (phase velocity as a function of frequency or wave length) is determined by evaluating the slope (linear) of each series of signals obtained for the same frequency.

This technique widely used in geophysics (down hole, seismic, reflection etc . . . ) and known for a long time (Griffithst, D. H. and King, R. F. 1965, in *Applied Geophysics for engineers and geologists*, Pergamon Press, New York, p. 223.) allows, in this case to determine the phase velocity of the wave or of the coherent mode (dominant), that corresponds to the fundamental mode of the Rayleigh waves according to the hypothesis of the method, and to eliminate or ignore at the same time all the other modes or wave types.

Indeed, the MASW method is based on the hypothesis of an optimal configuration for the production of the dominant fundamental mode of the Rayleigh waves and a weak energy of the superior modes and of the other types of waves (shear and compression), Thus, the energies of the other types of waves and of the superior modes are considered as being a noise.

Determination of the profile of the shear wave velocity, called "inversion process", is carried out similarly as in the SASW method, i.e. by comparing the experimental dispersion curve with a theoretical dispersion curve corresponding to a medium that is defined by a certain number of layers to which are assigned a thickness, a velocity, a density and a Poisson ratio.

OBJECTS OF THE INVENTION

An object of the present invention is therefore to present a method of modal analysis of surface waves for the purpose of overcoming certain limitations of the preceding methods, such as those described above. This new method is represented by the designation SWAP ("Surface Wave Automated Profiling").

Another object of the present invention is to propose an algorithm allowing the use of this method.

Other objects and characteristics of the present invention will appear from the description that follows, and that relates to a preferred, non limiting embodiment, and illustrated in the annexed figures of drawings.

SUMMARY

The invention provides a method, using a Rayleigh wave, for establishing a set of dispersion curves characterizing a ground, wherein each dispersion curve is associated to a propagation mode of the Rayleigh wave. The method comprises deploying on a surface of the ground a plurality of sensors, generating a surface wave in the ground and monitoring with the sensors a propagation of the surface wave for providing a plurality of signals in the time domain, wherein the signals comprise a spectrum of frequencies. The method also comprises determining, from the plurality of signals, and for each of the frequencies, an energy distribution as a function of phase travel time and group travel time, identifying a set of the propagation modes of the Rayleigh wave using the energy distribution and establishing, for each identified propagation mode, a dispersion curve using the energy distribution, thereby providing the set of dispersion curves characterizing said ground.

Advantageously, the determination of the energy distribution comprises computing a wavelet transform of the signals as a function of the phase travel time and group travel time.

The method further comprises inverting the dispersion curves for determining a profile of shear velocity as a function of the ground depth, the inversion comprising reconstituting the shear wave velocity profile that corresponds to at least two of the dispersion curves.

The method further comprises inverting the dispersion curves for determining a profile of a Poisson ratio as a function of the ground depth, the inversion comprising reconstituting the profile of the Poisson ratio that corresponds to at least two of the dispersion curves.

The method further comprises inverting the dispersion curves for determining a profile of a Poisson ratio and a shear wave velocity profile, both profiles being characteristics of the ground, as a function of the ground depth, the inversion comprising reconstituting the profile of the Poisson ratio and the profile of the shear wave velocity that will simultaneously correspond to at least two dispersion curves.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

In the following description of the embodiments, references to the accompanying drawings are by way of illustration of an example by which the invention may be practiced. It will be understood that other embodiments may be made without departing from the scope of the invention disclosed.

Generally, there is presented a method and an algorithm to solve certain problems encountered in previous methods, particularly associated with the determination of dispersion modes for the different modes of Rayleigh waves for signals recorded in the field.

More specifically, the method according to the present invention requires no hypothesis a priori with respect to the importance of the different modes that contribute to the signals recorded in the field. It consists in determining and separating the different modes of the Rayleigh waves in order to use them for a better characterization of the medium under examination.

A specific mode for carrying out the present invention will now be described in a purely indicative way.

Figure 1:
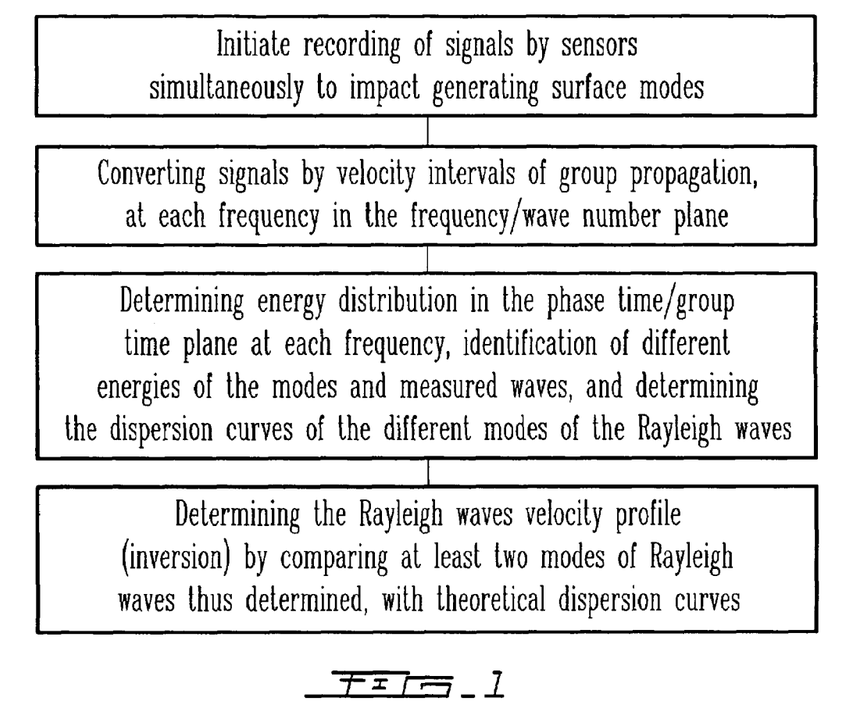
FIG. 1 is a schematic representation of the steps of the method according to a possible embodiment of the present invention.
Figure 2:
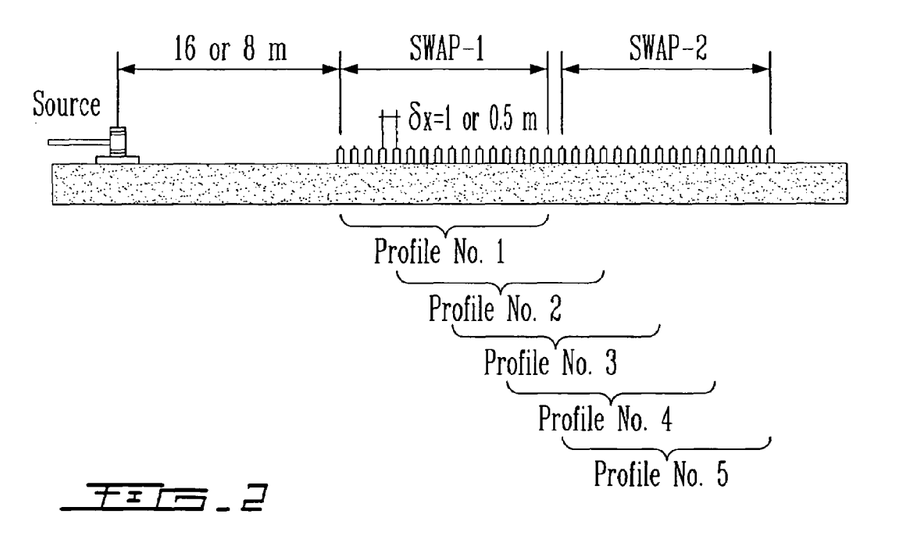
FIG. 2 is a schematic view of a system according to a possible embodiment of the present invention, showing 32 Rayleigh waves sensors allowing the analysis of a series of different sets of 16 sensor signals and leading to series of consecutive shear wave velocity profiles.

The method consists in generating surface waves by means of an impact source, and to detect same by means of sensors, located at one or different distance intervals as a function of the depth on which the test is carried out as well as of the nature of the field under study (FIG. 2). Thus, the sensors will be the more distant from one another, that the depth to be studied is important, for example. In addition, the distance between the sensors is adjusted as a function of the attenuation that characterized the medium under study.

Figure 3:
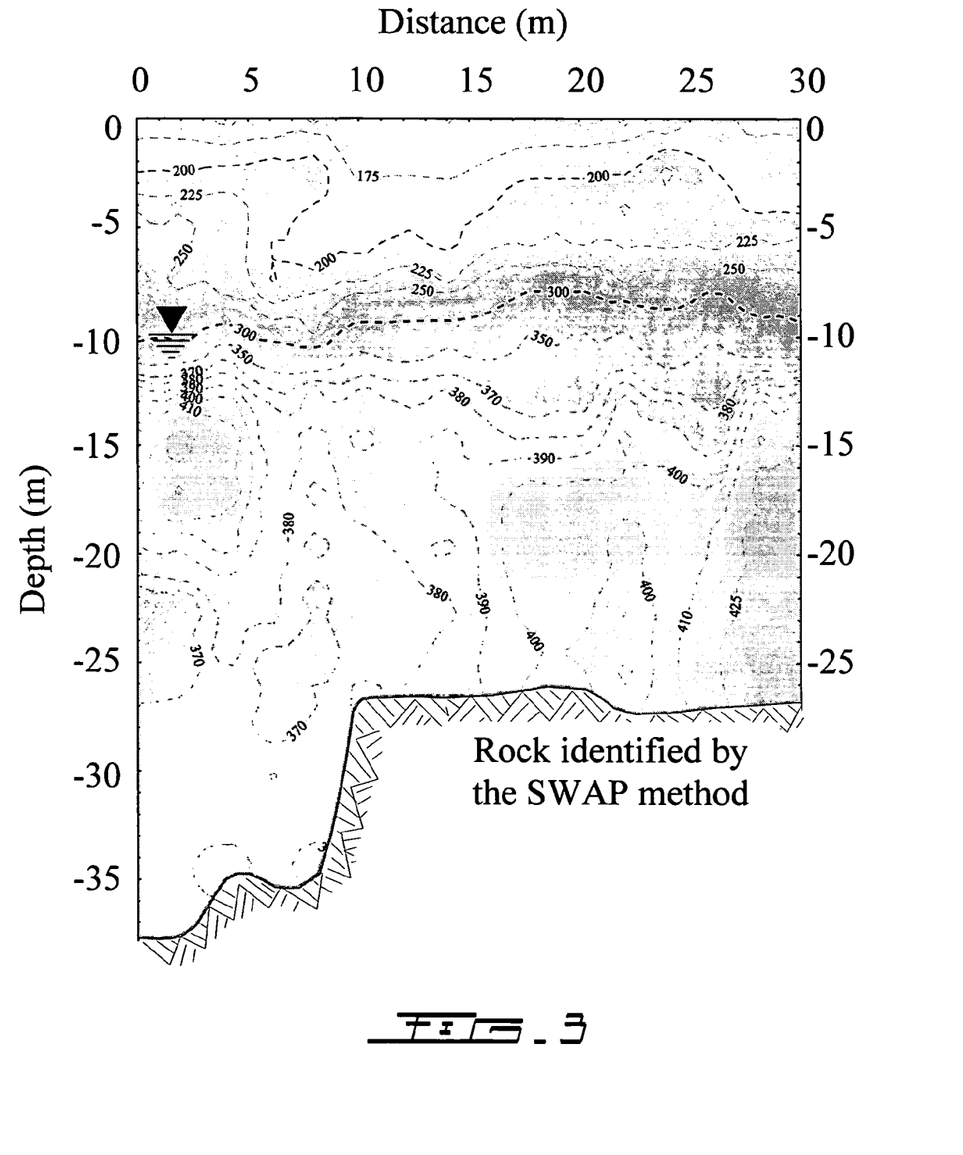
FIG. 3 is a tomographic representation of the several shear wave velocity profiles obtained with the method of FIG. 1.

The number of sensors used is a compromise between the cost involved and the sensitivity of the desired detection. A larger number of sensors allow a greater measurement precision. However, analyses have shown that the use of 16 sensors is a good compromise between the cost involved for the equipment and the precision that is sought. It is however possible to consider using a larger number of signals during the analysis (24 or 32) by using a larger number of sensors or by carrying out two consecutive SWAP tests while keeping the same source of energy as shown in FIG. 2. The carrying out of two consecutive SWAP tests allows a determination of a larger number of velocity profiles for shear waves by treating different combinations of 16 consecutive signals (FIG. 2). A determination of a larger number of velocity profiles thereafter allows a presentation of the results in the form of shear wave velocity tomography in two dimensions (FIG. 3).

Contrary to the SASW method, in which the analysis is carried out via a phase difference calculation (inter-correlation between the different signals, and to the MASK method in which the analysis goes through a calculation of coherence between the different signals, the present method analyses the signals that are collected in the frequency-number of wave plane (also called time-space plane), so as to determine an energy spectrum of the signals in these two fields. This procedure requires initiating recording of the signals already at the time of impact.

Figure 4:
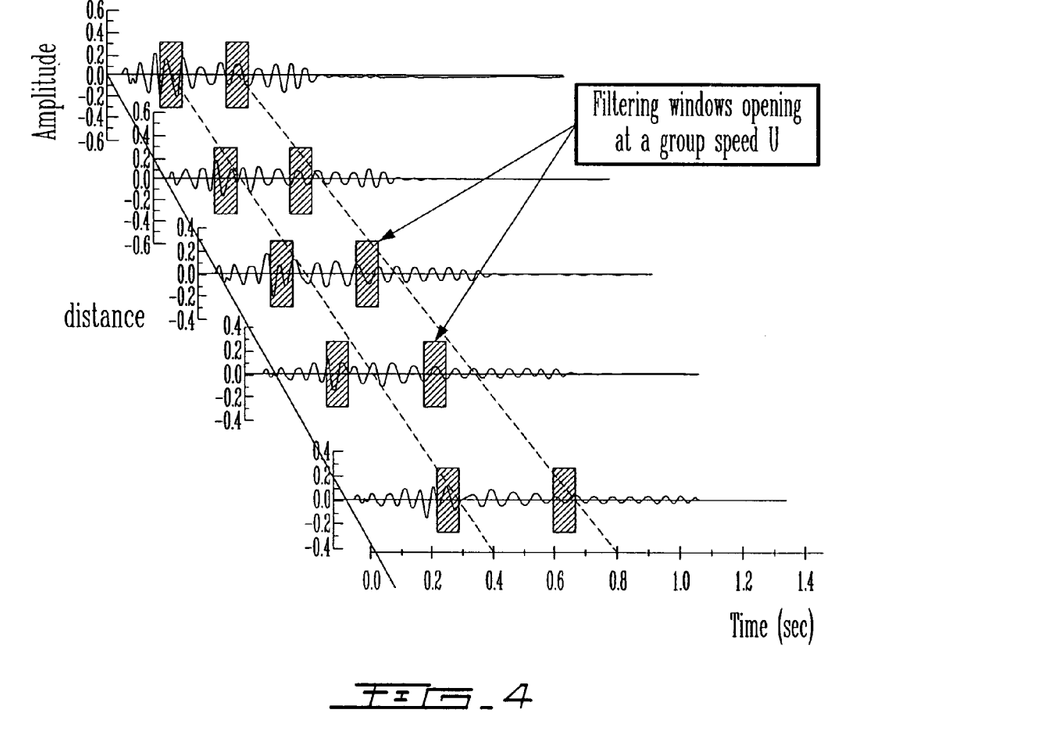
FIG. 4 is a schematic representation of the signal processing of the amplitude signal measured by a set of five sensors as a function of time, in accordance with the method of FIG. 1.

Since the limited number of sensors used (16) does not allow to obtain a specific sketch of energy distribution of the different modes of the Rayleigh waves in the frequency-wave number plane, the spectrum is determined for signal parts that correspond to a certain energy propagation velocity (so called group velocity). Thus, a wave that, for example, is propagated at a group velocity designated U, reaches the first sensor at a time, called group time, designated $t_1$, and reaches sensor x at group time $t_x$ that is equal to the distance between the source and sensor x divided by propagation velocity U (FIG. 4). An analysis of the signal parts at about group time $t_1$ permits an elimination of all the waves of the same frequency but of different group velocities (belonging to other Rayleigh wave modes or to other wave groups).

Figure 5A:
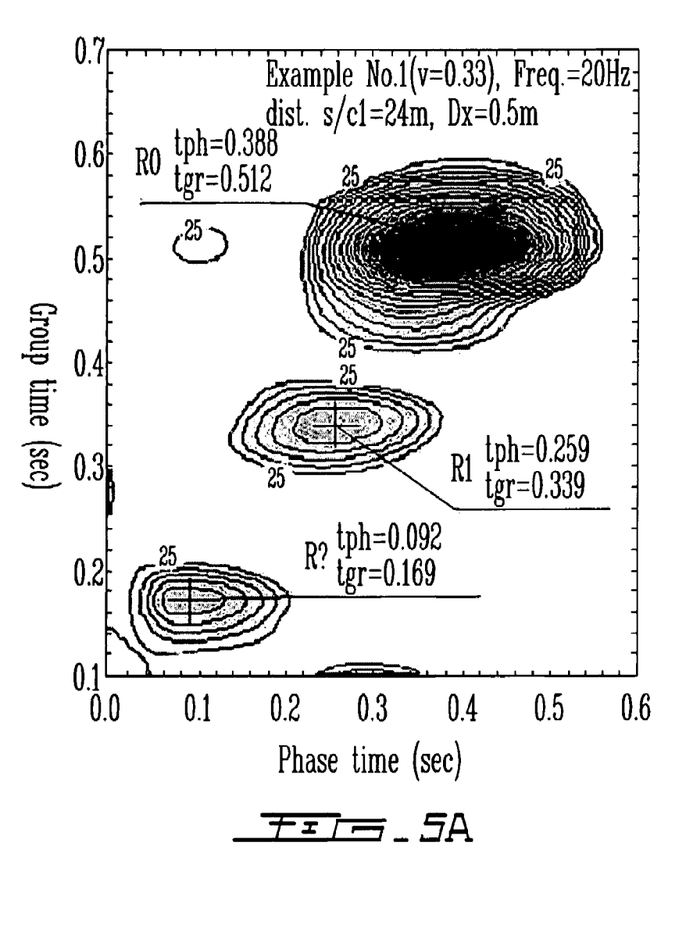
FIG. 5A and FIG. 5B are plots of the energy distribution in the phase time/group time plane, in accordance with the method of FIG. 1.
Figure 5B:
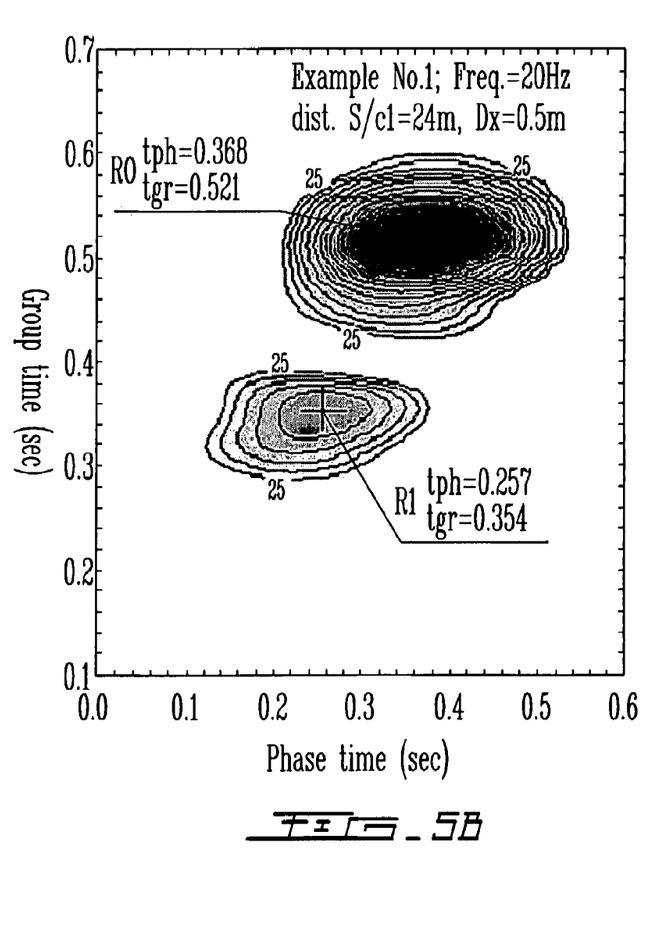
Figure 6:
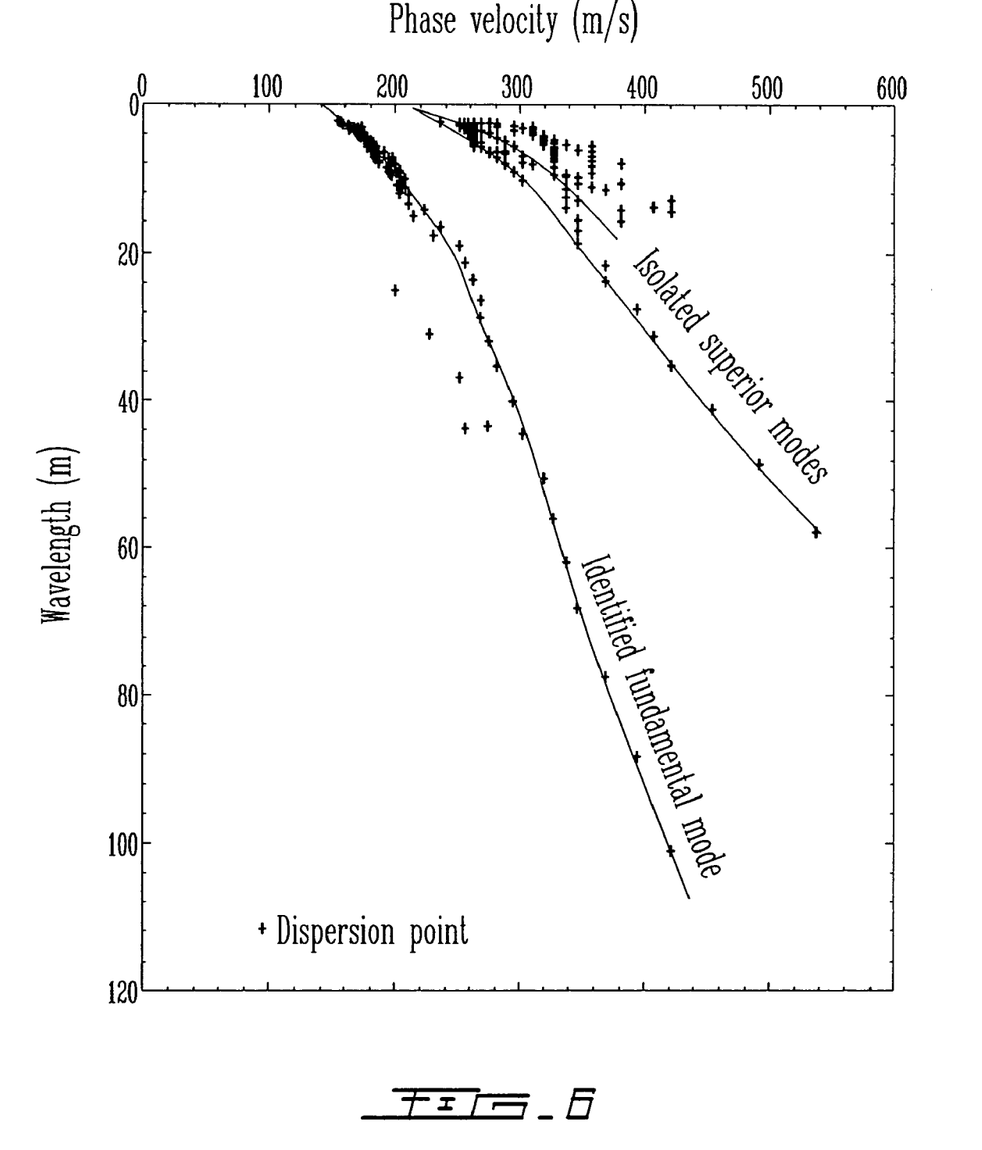
FIG. 6 is a graph representing dispersion curves determined from the energy distribution in the phase time/group time plane, in accordance with the method of FIG. 1.

This type of analysis is carried out for each frequency, and for a range of group velocities and of predetermined phase velocities. For each frequency, a sketch of energy distribution is thus obtained in the phase time—group time plane, which allows to easily determine the different energies of the modes and of the waves measured in the field (FIG. 5), and to determine the dispersion curves of the different modes for the Rayleigh waves as shown in FIG. 6.

It should be noted that treatment of the signals is carried out in an adaptable manner by means of a filtering procedure that allows to adjust the resolution to the frequency of analysis and that can be compared to an analysis by wavelets. The entire analysis process including separation, identification and selection of the different modes for purpose of inversion is automated.

The SWAP method also integrates a weighting system that allows modulating the energies of the different signals so as to give more importance to a specific point in space (located inside the distance covered by the sensors). This system not only allows a decrease of the perturbations of the points of dispersion that may be obtained with important variations in the medium under investigation, but also to produce, by means of different systems of equilibrium, at least three dispersion curves that represent different sites inside the distance covered by the 16 sensors.

Inversion, i.e., the determination of the shear wave velocity profile, is carried out from the dispersion curves of at least two Rayleigh wave modes.

Moreover, the inversion technique proposed in the present invention is based on a comparison between the experimental and theoretical dispersion curves, in terms of difference as well as in terms of shape, and allows a more rapid inversion and a better handling of experimental dispersion curves.

It will clearly appear to the man of the art that the SWAP method proposed in the present invention differs from methods such as SASW and MASW for example, by the fact that no hypothesis is made at the start with respect to the predominance of the fundamental mode of the Rayleigh waves. On the contrary, the present method tackles the problem in its entirety by identifying, in a first step, the different modes of the Rayleigh waves, and by reconstituting, in a second step, the medium that corresponds to these modes.

Thus, contrary to the existing methods, the SWAP method, according to an embodiment of the present invention, allows not only an unambiguous identification of the different components of the field (since it may happen that a superior mode dominates in a certain range of frequencies), but also an evaluation of Poisson ratio profile in addition to a velocity profile for shear waves $V_s$.

Figure 7A:
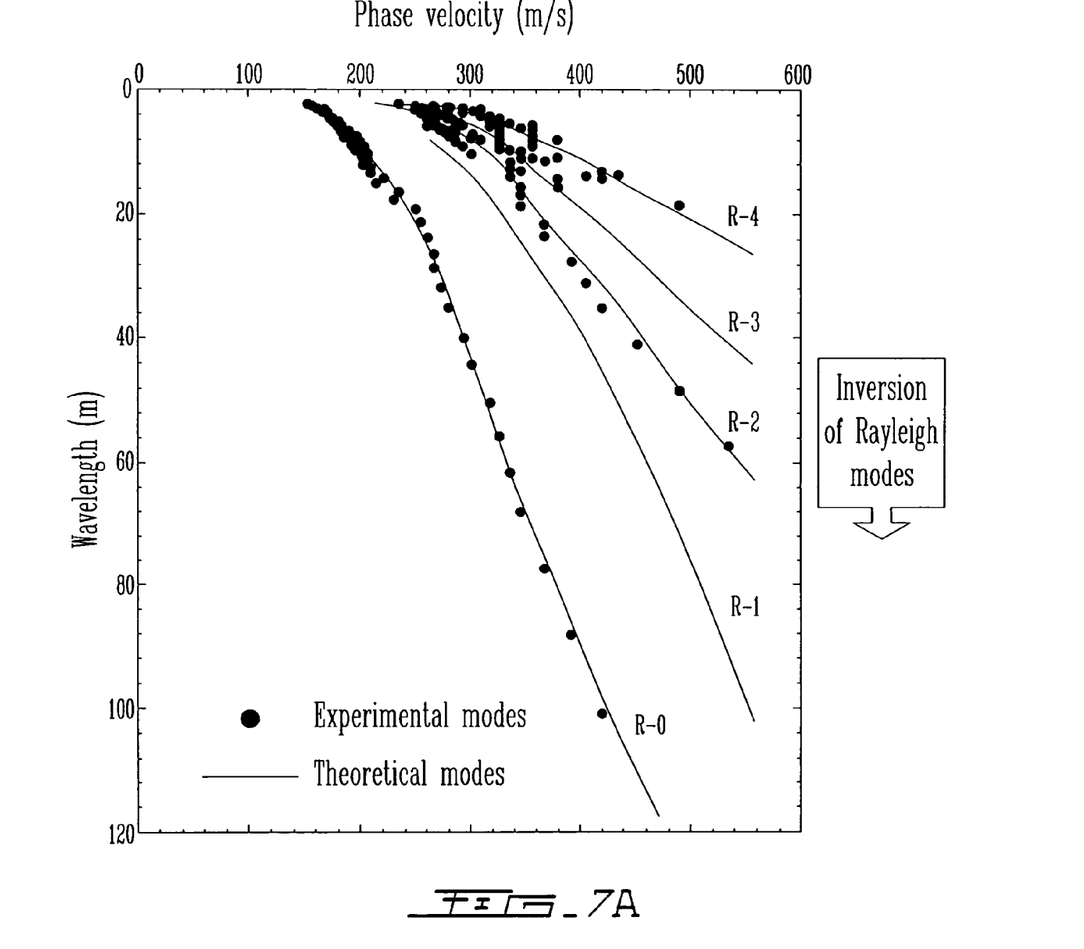
FIG. 7A is a graph of the theoretical dispersion curves established by inversion, in accordance with the method of FIG. 1.
Figure 7B:
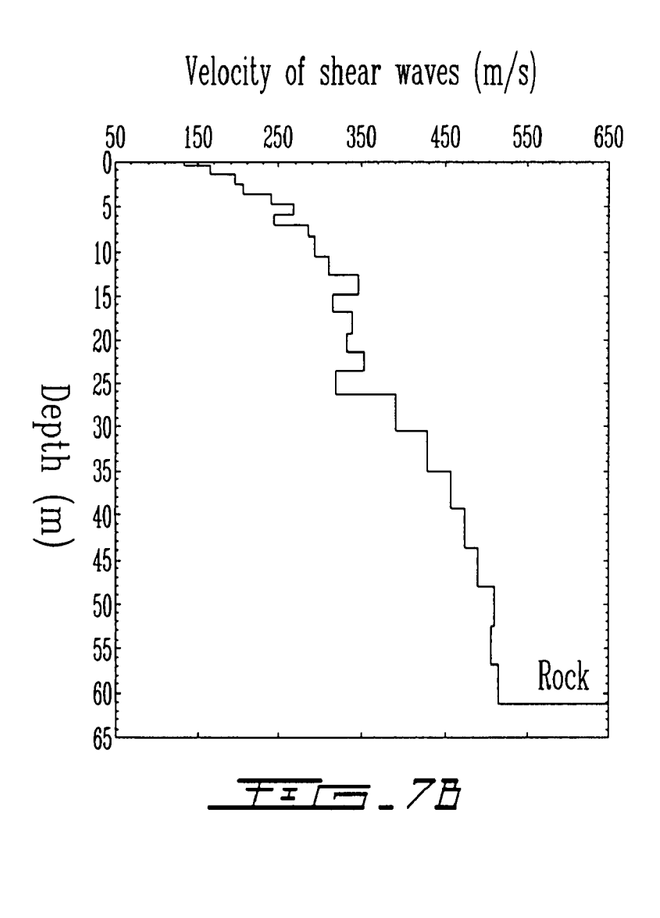
FIG. 7B is depth profile of the shear wave velocity established by inversion, in accordance with the method of FIG. 1.
Figure 7C:
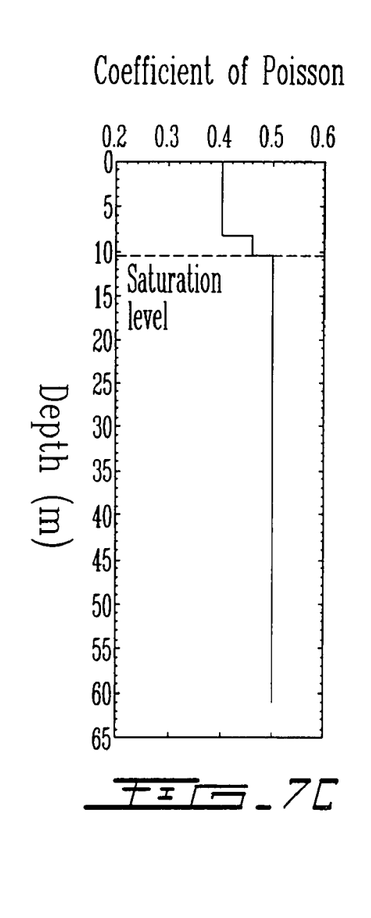
FIG. 7C is a depth profile of the Poisson ratio established by inversion, in accordance with the method of FIG. 1.

In fact, once the Rayleigh modes are separated so as to define the dispersion curve of the fundamental mode and, at least, of the superior mode, the use of these two dispersion curves in the inversion process leads to a unique solution since there is only one shear wave velocity profile and only one Poisson ratio profile that simultaneously satisfy the two dispersion curves. FIG. 7 shows an example of inversion with more than one mode of Rayleigh waves.

Thus, the knowledge of the velocity profile of shear waves $V_s$ and of the Poisson ratio profile, which is obtained by the same method, allows a complete characterization of the field on an elastic point of view.

It is obvious for one skilled in the art that the restrictions imposed by methods such as SASW, for example wave length selection criteria and constraints on the experimental configuration dealing for example with the spacing between the sensors and the source, are avoided in the method according to the present invention, since the different Rayleigh modes are identified and separated. For example, all the sensors may be excited at the same time in the present method, which makes a study of the field the more rapid.

From a technical point of view, the different steps of the method according to the invention are carried out by means of original algorithms. In particular, as suggested previously, the inversion process is based on a comparison of the calculated and experimental dispersion curves, not only in terms of difference in phase velocity, but also in terms of the shape of the dispersion curve.

This inversion process according to the present invention is automated thanks to an algorithm identified under the acronym INVSS. The use of shape criteria in addition to the difference allows a very fast convergence of the process. The treatment of the signals recorded in the field for the determination of the different modes of the Rayleigh wave is automated by means of an algorithm that is compatible with INVSS.

The method also breaks new ground by using the group velocity that corresponds to the propagation of the wave train or of the energy, and that is used for cleaning, identifying and verifying (coherence) of the different types of waves.

Moreover, the SWAP method of the present invention allows setting up a standard for the arrangement of a specific number of 16 sensors and the spacing provided according to the study under consideration.

It goes without saying that the present invention was described by way of indication only and that it may be provided with many other arrangements and variants without departing from the scope of the present invention such as defined in the following claims.

We claim:

1. A method, using a Rayleigh wave, for establishing a set of dispersion curves characterizing a medium, wherein each dispersion curve is associated to a propagation mode of said Rayleigh wave, the method comprising:
   deploying on a surface of the medium a plurality of sensors;
   generating a surface wave in the medium;
   monitoring with said sensors a propagation of the surface wave for providing a plurality of signals in the time domain, wherein said signals comprise a spectrum of frequencies;
   determining, from said plurality of signals, and for each of said frequencies, an energy distribution as a function of phase travel time and group travel time, wherein said determining an energy distribution comprises computing a wavelet transform of said signals as a function of said phase travel time and group travel time for providing said energy distribution;
   identifying a set of said propagation modes of the Rayleigh wave using said energy distribution;
   establishing, for each identified propagation mode, a dispersion curve using said energy distribution, thereby providing said set of dispersion curves characterizing said medium; and
   further comprising at least one of:
   inverting said dispersion curves for determining a profile of shear velocity as a function of a depth in said medium, said inversion comprising reconstituting the shear wave velocity profile that corresponds to at least two of said dispersion curves, wherein said reconstituting comprises adjusting said shear velocity profile such as to minimize an error between a calculated dispersion curve and an experimental dispersion curve, wherein said calculated dispersion curve is calculated with the shear velocity profile and wherein said experimental curve is one of said dispersion curves;
   inverting said dispersion curves for determining a profile of a Poisson ratio as a function of a depth in said medium, said inversion comprising reconstituting the profile of the Poisson ratio that corresponds to at least two of said dispersion curves; and
   inverting said dispersion curves for determining a profile of a Poisson ratio and a shear wave velocity profile, both profiles being characteristics of the medium, as a function of a depth in said medium, said inversion comprising reconstituting the profile of the Poisson ratio and the profile of the shear wave velocity that will simultaneously correspond to at least two dispersion curves.

2. The method of claim 1, wherein said determining an energy distribution comprises weighting said signals prior to computing the wavelet transform.

3. The method of claim 1 wherein said computing, determining, identifying and establishing are performed automatically.

4. The method as claimed in claim 1, wherein said reconstituting the shear wave velocity profile further comprises adjusting said shear velocity profile such as to minimize a difference between a shape of the calculated dispersion curve and a shape of the experimental dispersion curve.

5. The method as claimed in claim 1, wherein said reconstituting the profile of the Poisson ratio comprises adjusting said profile of the Poisson ratio such as to minimize an error between a calculated dispersion curve and an experimental dispersion curve, wherein said calculated dispersion curve is calculated with the profile of the Poisson ratio and wherein said experimental curve is one of said dispersion curves.

* * * * *